United States Patent
Kneissl et al.

(10) Patent No.: US 11,719,224 B2
(45) Date of Patent: Aug. 8, 2023

(54) ROTOR BLADE OF A WIND TURBINE, HAVING A SPLITTER PLATE

(71) Applicant: Wobben Properties GmbH, Aurich (DE)

(72) Inventors: Stefan Kneissl, Kempen (DE); Jochen Stemberg, Aurich (DE)

(73) Assignee: Wobben Properties GmbH, Aurich (DE)

( * ) Notice: Subject to any disclaimer, the term of this patent is extended or adjusted under 35 U.S.C. 154(b) by 74 days.

(21) Appl. No.: 16/970,293

(22) PCT Filed: Feb. 18, 2019

(86) PCT No.: PCT/EP2019/053932
§ 371 (c)(1),
(2) Date: Aug. 14, 2020

(87) PCT Pub. No.: WO2019/158744
PCT Pub. Date: Aug. 22, 2019

(65) Prior Publication Data
US 2021/0079886 A1    Mar. 18, 2021

(30) Foreign Application Priority Data
Feb. 19, 2018 (DE) ............... 10 2018 103 678.7

(51) Int. Cl.
F03D 1/06 (2006.01)

(52) U.S. Cl.
CPC ......... F03D 1/0683 (2013.01); F03D 1/0641 (2013.01); *F05B 2240/21* (2013.01); *F05B 2240/31* (2013.01)

(58) Field of Classification Search
CPC .. F03D 1/0683; F03D 1/0641; F05B 2240/21; F05B 2240/31; F05B 2240/304; F05B 2240/305; Y02E 10/72
See application file for complete search history.

(56) References Cited

U.S. PATENT DOCUMENTS 5,265,830 A    11/1993 Allen
8,419,373 B1 *  4/2013 Fukami ............... F03D 1/0633
                                                     416/243

(Continued)

FOREIGN PATENT DOCUMENTS

CN    102996326 A    3/2013
CN    103362755 A    10/2013

(Continued)

*Primary Examiner* — David E Sosnowski
*Assistant Examiner* — Wayne A Lambert
(74) *Attorney, Agent, or Firm* — Seed Intellectual Property Law Group LLP

(57) ABSTRACT

A rotor blade of a wind turbine, wherein the rotor blade has in particular a splitter plate, which is arranged on the blunt trailing edge of the rotor blade. The splitter plate comprises: a root edge, wherein the root edge is arranged on, in particular along, the trailing edge below a transition from the suction side into the trailing edge, an end edge, wherein the end edge forms a free edge, and a surface between the root edge and the end edge, wherein the surface has at least one curved part between the root edge and the end edge, and at least one part of the surface lies in the shear layer generated by the suction side. A rotor blade of a wind turbine, wherein the rotor blade has in particular a splitter plate, which is arranged on the blunt trailing edge of the rotor blade. The splitter plate comprises: a root edge, wherein the root edge is arranged on, in particular along, the trailing edge below a transition from the suction side into the trailing edge, an end edge, wherein the end edge forms a free edge, and a surface between the root edge and the end edge, wherein the surface has at least one curved part between the root edge and the end edge, and at least one part of the surface lies in the shear layer generated by the suction side.

24 Claims, 3 Drawing Sheets

(56) References Cited

U.S. PATENT DOCUMENTS

| | | | |
|---|---|---|---|
| 9,897,067 B2 * | 2/2018 | Grasso | F03D 1/0633 |
| 10,767,625 B2 * | 9/2020 | Kamruzzaman | F03D 1/0675 |
| 2009/0263252 A1 * | 10/2009 | Slot | F03D 1/0641 |
| | | | 416/223 R |
| 2012/0269644 A1 * | 10/2012 | Enevoldsen | F03D 1/0641 |
| | | | 416/235 |
| 2015/0050154 A1 | 2/2015 | Dixon et al. | |
| 2015/0118058 A1 * | 4/2015 | Vedula | F03D 1/0658 |
| | | | 416/236 R |
| 2017/0241400 A1 * | 8/2017 | Whitehouse | F03D 1/0641 |
| 2018/0238298 A1 * | 8/2018 | Grasso | F03D 7/024 |
| 2022/0112874 A1 * | 4/2022 | Stemberg | F03D 1/0641 |

FOREIGN PATENT DOCUMENTS

| | | | | |
|---|---|---|---|---|
| CN | 204553084 U | | 8/2015 | |
| CN | 205876598 U | * | 1/2017 | |
| CN | 107438713 A | | 12/2017 | |
| DE | 102011012965 B4 | | 10/2015 | |
| DE | 202016101461 U1 | | 3/2016 | |
| EP | 2063106 A1 | | 5/2009 | |
| EP | 2322793 A1 | | 5/2011 | |
| EP | 2604856 A1 | | 6/2013 | |
| EP | 2806156 A1 | | 11/2014 | |
| EP | 3399183 A1 | * | 11/2018 | F03D 1/0633 |
| KR | 101466076 B1 | | 11/2014 | |
| WO | WO-2011029447 A2 | * | 3/2011 | F03D 1/0641 |
| WO | WO-2014146756 A1 | * | 9/2014 | F03D 1/0675 |
| WO | 2016/055076 A1 | | 4/2016 | |
| WO | WO-2016162350 A1 | * | 10/2016 | F03D 1/06 |

* cited by examiner

ROTOR BLADE OF A WIND TURBINE, HAVING A SPLITTER PLATE

BACKGROUND

Technical Field

The present invention relates to a rotor blade of a wind turbine, to a wind turbine having the rotor blade, to a splitter plate for use on the rotor blade, and to a method for optimizing the rotor blade.

Description of the Related Art

Wind turbines, which generate electrical energy from the kinetic energy of the wind and feed said electrical energy into an electrical power supply grid, are generally known. Nowadays, rotor blades having a thin plate-like profile and a large blade depth are frequently used in such wind turbines for increasing efficiency. However, this requires a multi-part construction with trailing-edge segments, which is highly cost-intensive and susceptible to faults. Alternatively, use may be made of rotor blades having an at least partially blunt trailing edge in the inner region. However, rotor blades having an at least partially blunt trailing edge have the disadvantage that the lift power is reduced in the region of the blunt trailing edge owing to the relatively small blade depth and, furthermore, vortices can form in this region in the form of a so-called Kármán street, which vortices lead to increased air resistance and increased noise emission.

The use of splitter plates for improving the aerodynamic properties of aircraft wings is known. For example, U.S. Pat. No. 5,265,830 A discloses a splitter plate, in the form of a simple straight plate, to be attached at a predefined angle to a blunt trailing edge of a wing for an aircraft so as to improve the aerodynamic properties of the wing. The attachment of such a splitter plate to the trailing edge of a rotor blade makes it possible for formation of a Kármán street and thus increased resistance to be prevented. However, it is in this case accepted that the flow around the rotor blade still separates at the trailing edge and no lift gain is therefore achievable.

The German Patent and Trademark Office has searched the following prior art in the priority application relating to the present applications: DE 10 2011 012 965 B4, DE 20 2016 101 461 U1, U.S. Pat. No. 5,265,830 A, EP 2 063 106 A1 and WO 2016/055076 A1.

BRIEF SUMMARY

Provided are techniques which makes it possible to improve the powers of rotor blades having at least one partially blunt trailing edge while simultaneously reducing the noise emission.

Provided is a rotor blade of a wind turbine, wherein the rotor blade has:
- a leading edge and a blunt trailing edge,
- a suction side and a pressure side between the leading edge and the trailing edge, wherein the suction side generates a shear layer when air flows around,
- wherein the leading edge, the blunt trailing edge, the suction side and the pressure side form a reference system in which the leading edge is arranged in front of the trailing edge and the suction side is arranged above the pressure side, and wherein, in said reference system, a profile chord direction extends from the leading edge to the trailing edge, and
- a splitter plate, which is arranged on the blunt trailing edge of the rotor blade, wherein the splitter plate has:
  - a root edge, wherein the root edge is arranged on, in particular along, the trailing edge below a transition from the suction side into the trailing edge,
  - an end edge, wherein the end edge forms a free edge, and
  - a surface between the root edge and the end edge, wherein the surface has at least one curved part between the root edge and the end edge, and at least one part of the surface lies in the shear layer generated by the suction side.

The arrangement of the splitter plate below the transition from the suction side into the trailing edge allows the formation of a Kármán street to be effectively prevented, with the result that both the resistance and the noise emission of the rotor blade are reduced. At the same time, owing to the curvature of the splitter plate and the arrangement of the splitter plate such that at least one part of the surface of the splitter plate lies in the shear layer, it can be achieved that the shear layer re-attaches to the surface of the splitter plate. This ensures improved lift of the rotor blade in the region of the splitter plate. By means of a curved splitter plate, as described above, it is consequently possible to improve the power of a rotor blade having a blunt trailing edge while simultaneously reducing the noise emission.

The suction side of the rotor blade corresponds to that surface of the rotor blade which, during the operation of the wind turbine, generates lift and, when air flows around, thereby drives the rotation of a rotor to which the rotor blade is fastened. Here, the pressure side is opposite the suction side. When air flows around, a shear layer forms both on the suction side and on the pressure side, wherein only the shear layer on the suction side is to be considered in the following text.

Shear layers form in crossover regions of parallel flows having different speeds. In the case of a rotor blade, it can be assumed that an air flow which flows around the rotor blade has a speed of zero directly on the surface of the rotor blade owing to the friction between rotor blade and air. As the distance from the surface increases, the speed becomes larger until the speed of the surrounding air flow is reached. This crossover is referred to as a shear layer or boundary layer, with the thickness of the shear layer being dependent on the internal friction of the air. Here, it is known that, for a flow speed which lies in a typical range of a flow speed about a rotor blade during the operation of a wind turbine, such a shear layer extends beyond the end of the suction side at the trailing edge of the rotor blade and breaks down, for example by way of vortex formation, only at a certain distance from the trailing edge of the rotor blade. Here, at the trailing edge, the shear layer runs between the stagnation zone and the flow around the profile.

The rotor blade has, at least partially, a blunt trailing edge, that is to say that the rotor blade, at its rear end, that is to say at the trailing edge, still has a specific trailing edge thickness and accordingly does not have arbitrarily sharp tapering. Other parts of the rotor blade, in particular those parts of the rotor blade which are situated far outside, preferably do not have a blunt trailing edge. In a preferred embodiment, the blunt trailing edge has a trailing edge thickness of more than 0.5% of a profile depth of the rotor blade.

Furthermore, in addition to the splitter plate, the rotor blade may have further aerodynamic elements, such as one or more Gurney flaps, vortex generators or slats. Preferably, the rotor blade additionally has a Gurney flap or similar structures on the pressure side. A Gurney flap generates a curvature of the shear layer behind the suction side, such that the shear layer can attach to a curved surface of a splitter plate more effectively. A combination of a Gurney flap with a splitter plate can therefore additionally increase the power of the rotor blade. In an embodiment of the rotor blade with a Gurney flap, the blunt trailing edge can also be produced by the Gurney flap alone.

The splitter plate is arranged in that region of the rotor blade in which the rotor blade has the blunt trailing edge, and extends along the blunt trailing edge. In a preferred embodiment, the root edge extends parallel to the transition from the suction side into the trailing edge.

It is proposed that the curved part of the surface lies at least partially in the shear layer. Depending on the configuration of the suction side of the rotor blade, the course of the shear layer, in particular the curvature of the shear layer, can vary behind the transition from the suction side into the trailing edge. If at least part of the curved surface is brought into the shear layer, this makes possible particularly effective re-attachment of the shear layer on the curved part of the surface of the splitter plate.

It is furthermore proposed that the curvature of the curved part which lies in the shear layer is determined on the basis of a determination of the stress capacity of the shear layer. Here, the stress capacity of the shear layer is defined by the maximum pressure gradient which the shear layer can overcome without separating. The determination of the curvature of the splitter plate on the basis of the stress capacity of the shear layer has the advantage that, for each rotor blade geometry, the splitter plate can be adapted such that optimal attachment of the shear layer to the splitter plate can be achieved.

It is furthermore proposed that the curved part of the surface has clockwise curvature with respect to the profile chord direction of the rotor blade. By way of clockwise curvature of the surface with respect to the profile chord direction, it can be achieved that the surface of the splitter plate optimally follows the shear layer and the lift power of the rotor blade is thereby improved. In a preferred embodiment, a point on the surface of the splitter plate at which the surface of the splitter plate is at a maximum distance from a profile chord of the rotor blade is the root edge. In this case, the profile chord, or chord line, is defined as an imaginary connecting line between a leading edge and a trailing edge of the rotor blade. Alternatively, that point on the surface of the splitter plate at which the surface of the splitter plate is at a maximum distance from the profile chord of the rotor blade may also lie between the root edge and the end edge.

It is furthermore proposed that the curved part of the surface has a first part and a second part, wherein the first part and the second part have different curvatures. In a preferred embodiment, the first part has counterclockwise curvature with respect to the profile chord direction of the rotor blade, and the second part has clockwise curvature with respect to the profile chord direction of the rotor blade. Here, it is advantageous if the second part adjoins the first part in the profile chord direction. The transition between the first part, which has counterclockwise curvature, and the second part, which has clockwise curvature, may be realized continuously or through the provision of an edge. It is furthermore advantageous if the second part starts, in the profile chord direction, from at least two thirds of a length of the splitter plate in the profile chord direction. In a preferred embodiment, the clockwise curvature of the second part in the profile chord direction decreases continuously. In this way, optimal attachment of the shear flow to the splitter plate can be promoted. It is furthermore proposed that that point on the surface of the splitter plate at which the surface of the splitter plate is at a maximum distance from the profile chord of the rotor blade lies in the second part.

It is furthermore proposed that the curved part of the surface begins at the root edge.

It is furthermore proposed that the splitter plate has a straight part, and the straight part adjoins the curved part, and ends with the end edge, in the profile chord direction. Since it is often the case that the shear flow has only small curvature behind the suction side, the provision of a straight part after the curved part can offer improved adaptation to the course of the shear flow. It is therefore in particular preferable that the straight part lies at least partially in the shear flow.

It is moreover proposed that the trailing edge of the rotor blade has a trailing edge thickness, and the length of the splitter plate between the root edge and the end edge in the profile chord direction is 0.75-1.5 times the trailing edge thickness. Alternatively, it is proposed that the length of the splitter plate is less than a distance which is defined by the trailing edge and a point of intersection of a tangent to the suction side in the region of the trailing edge with the profile chord. A splitter plate having a length in the aforementioned range has the advantage that the splitter plate can generate the same power as, for example, a closed trailing edge, with lower usage of material.

In a preferred embodiment, the end edge of the splitter plate is at a greater distance from the profile chord of the rotor blade than the root edge, wherein the end edge of the splitter plate lies in the shear layer. This has the advantage that the splitter plate can be designed with a smaller length, which leads to a material and transport cost saving.

It is furthermore proposed that the splitter plate is arranged on the trailing edge of the rotor blade such that the root edge is at a distance from the profile chord of the rotor blade. In a preferred embodiment, the distance of the root edge from the profile chord is set such that a part of the splitter plate lies in the shear layer.

It is furthermore proposed to arrange the splitter plate on the trailing edge of the rotor blade by means of a hinge. This has the advantage that the splitter plate can be folded in, for example during transport, thus resulting in a small transport dimension for the rotor blade. Simple swinging-open of the splitter plate then facilitates the assembly on site. Furthermore, there may be provided an active control means for the splitter plate, which control means controls swinging-open and folding-in in a manner dependent on a desired power of the wind turbine. Alternatively, the hinge may also have a mounting under spring force, such that, upon exceedance of a predetermined pressure force, the splitter plate folds in automatically.

A wind turbine having a rotor blade as described above is furthermore proposed.

Furthermore, a splitter plate for use on a rotor blade of a wind turbine is proposed, wherein the splitter plate has:

a root edge, wherein the root edge is suitable for being arranged on, in particular along, a trailing edge of the rotor blade, an end edge, wherein the end edge is suitable for forming a free edge, and a surface between the root edge and the end edge, wherein the surface has at least one curved part between the root edge and the end edge, and at least one part of the surface is suitable for lying in a shear layer generated by a suction side of the rotor blade.

Furthermore, a method for optimizing a rotor blade of a wind turbine is proposed, wherein the method comprises the steps of:

determining a flow pattern of the rotor blade, wherein the determination comprises a determination of a location of a shear layer which is generated by a suction side of the rotor blade, and determining a distance of the root edge of the splitter plate from a profile chord of the rotor blade, and a curvature of the splitter plate, such that at least a part of the splitter plate lies in the shear flow.

It should be understood that the rotor blade, the wind turbine, the splitter plate, and the method have similar and/or identical preferred embodiments.

BRIEF DESCRIPTION OF THE SEVERAL VIEWS OF THE DRAWINGS

The present invention will now be discussed in more detail below by way of example on the basis of exemplary embodiments with reference to the accompanying figures.

DETAILED DESCRIPTION

Figure 1:
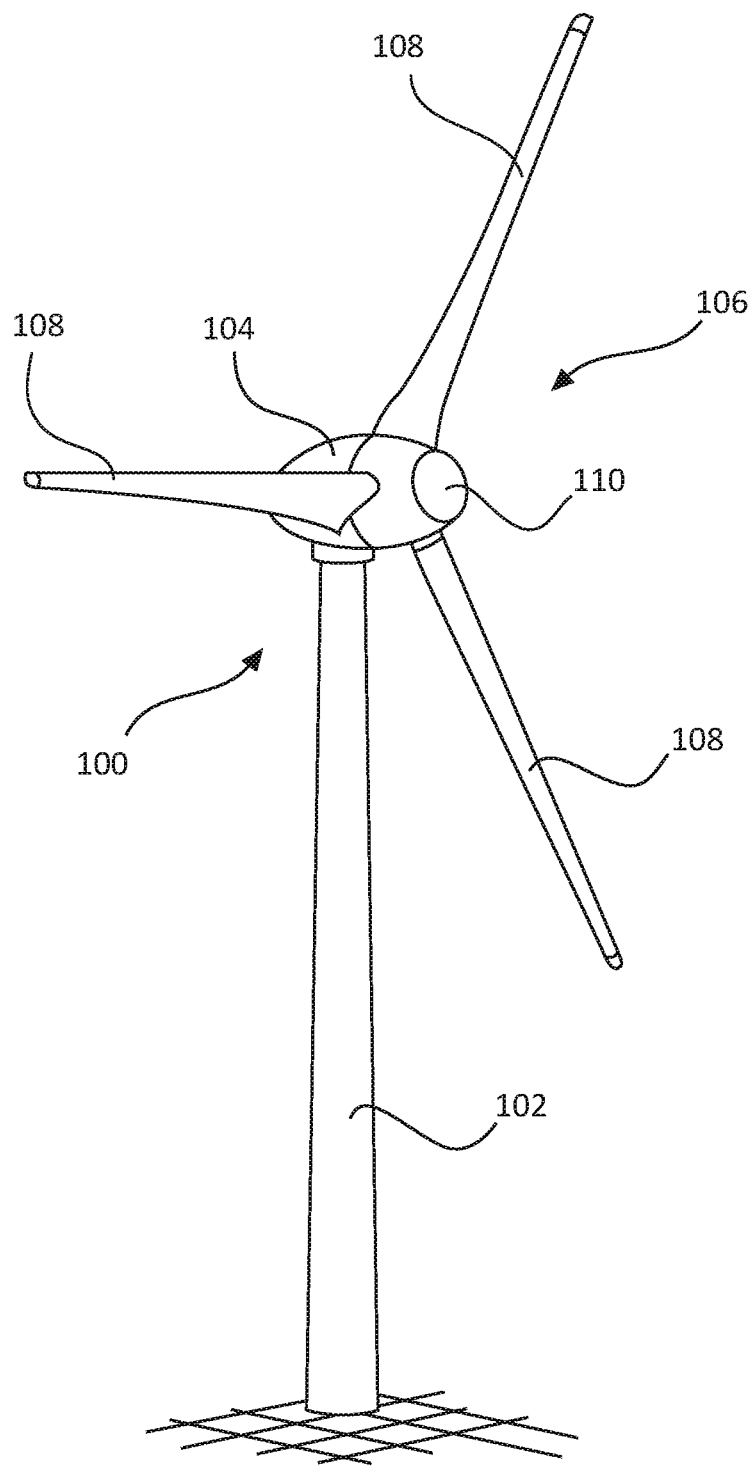
FIG. 1 shows a schematic view of a wind turbine having a rotor blade according to the invention.

FIG. 1 shows a schematic illustration of a wind turbine according to the invention. The wind turbine 100 has a tower 102 and a nacelle 104 on the tower 102. An aerodynamic rotor 106 having three rotor blades 108 according to the invention and having a spinner 110 is provided on the nacelle 104. During the operation of the wind turbine, the aerodynamic rotor 106 is set in rotational motion by the wind and thereby also rotates an electrodynamic rotor or runner of a generator, which is coupled directly or indirectly to the aerodynamic rotor 106. The electric generator is arranged in the nacelle 104 and generates electrical energy. The pitch angles of the rotor blades 108 can be changed by pitch motors at the rotor blade roots of the respective rotor blades 108.

Figure 2:
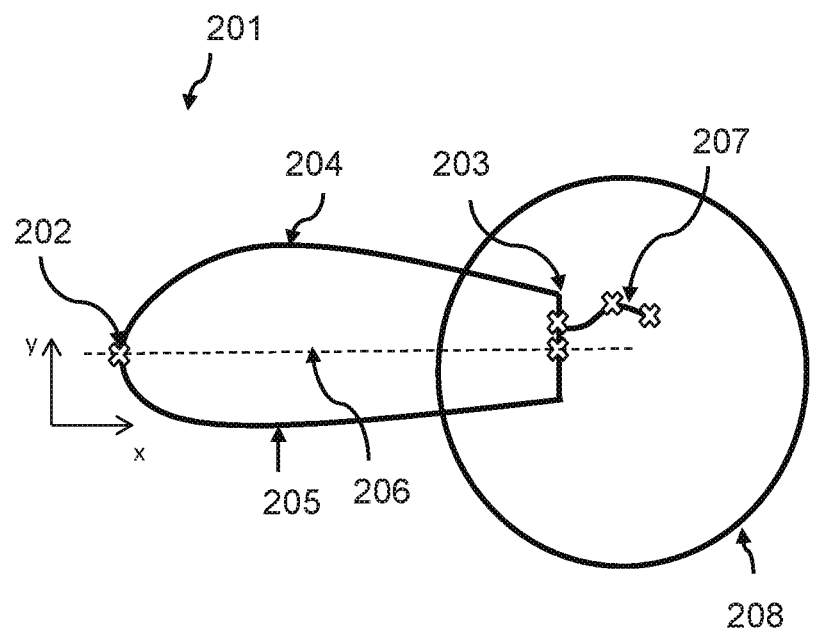
FIG. 2 schematically shows a profile section of a rotor blade with a splitter plate.

FIG. 2 schematically shows a profile section through a rotor blade of the wind turbine 100. Here, the rotor blade 201 has a leading edge 202 and a trailing edge 203. For this profile, the trailing edge 203 is in the form of a blunt trailing edge 203 with a specific trailing edge thickness. Here, the blunt trailing edge 203 extends outward preferably from a starting point of the rotor blade 201 at the rotor, wherein, from a particular length of the rotor blade 201, the blunt trailing edge 203 transitions into a converging trailing edge. The rotor blade 201 furthermore has a suction side 204 and a pressure side 205. The profile chord 206 defines a profile chord direction from the leading edge 202 to the trailing edge 203, wherein, in the drawing, the profile chord direction corresponds to the direction of the X-axis. A shear flow is generated on the suction side 204 of the rotor blade 201, wherein it is assumed that the air flows around the rotor blade 201 in the profile chord direction, that is to say the X direction. Here, the shear flow continues beyond the transition from the suction side 204 to the trailing edge 203, that is to say, in this embodiment, beyond the trailing edge 203.

The profile of the rotor blade 201 shown here is purely schematic, and the rotor blade 201 may have any desired advantageous profile, as long as the profile shows, at least in parts, a blunt trailing edge.

Figure 3:
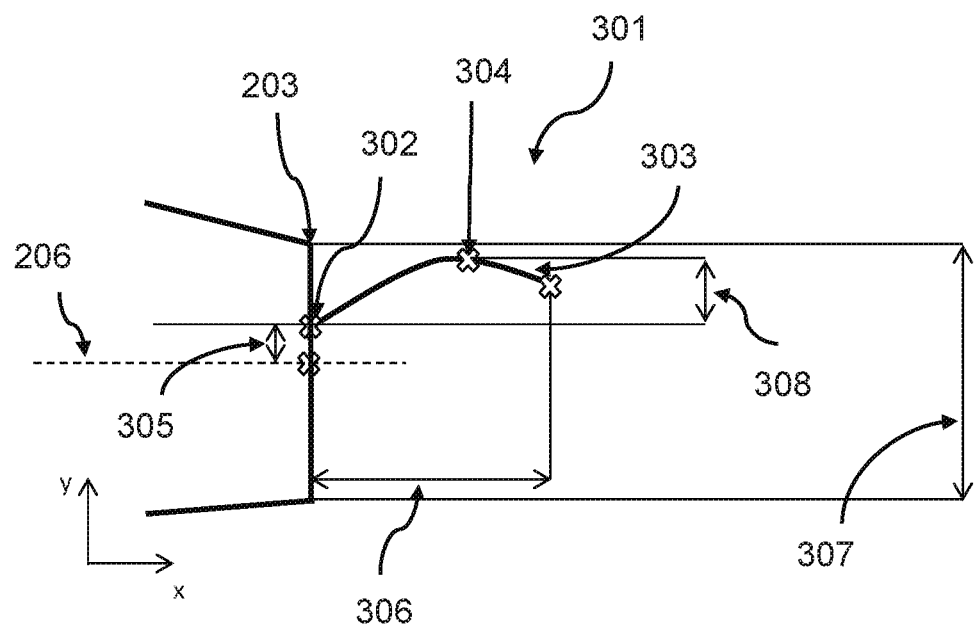
FIGS. 3 to 5 schematically show different embodiments of a splitter plate.
Figure 4:
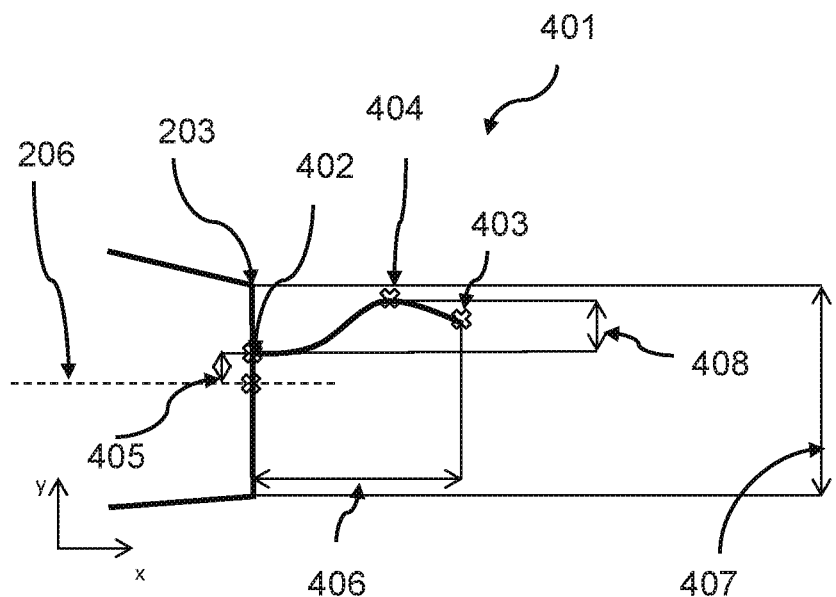
Figure 5:
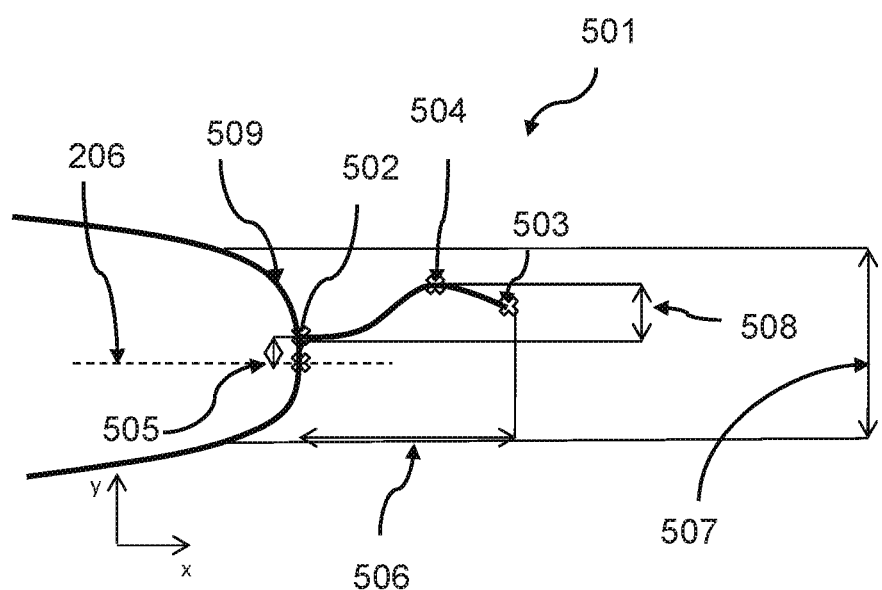

The rotor blade 201 furthermore has a splitter plate 207, wherein an enlarged detail 208 of parts of the rotor blade 201, in particular the trailing edge 203, and the splitter plate 207 is considered more closely in FIGS. 3 to 5.

FIG. 3 shows a first embodiment of a preferred splitter plate, wherein the same reference signs denote identical features. The splitter plate 301 shown in FIG. 3 has a root edge 302 and an end edge 303. The surface of the splitter plate 301 has a positive curvature in the profile chord direction, that is to say the X direction, between the root edge 302 and the end edge 303. The point 304 indicates firstly the point of the splitter plate 301 at which the surface of the splitter plate 301 assumes a maximum distance from the profile chord 206 of the rotor blade 201, and secondly the point at which the shear flow generated by the suction side 204 attaches to the splitter plate 301. In this embodiment, the root edge 302 of the splitter plate 301 is arranged below the transition from the suction side 204 to the trailing edge 203, but above the profile chord 206. The root edge 302 thus has a distance 305 from the root edge 302 to the profile chord 206. When the splitter plate 301 is arranged on the rotor blade 201, said distance 305 may be selected such that the splitter plate 301 optimally adjoins the shear layer from the point 304. Also, it is possible for the distance 308 between the root edge 302 and the point 304 at the maximum distance of the surface of the splitter plate 301 from the profile chord 206 to likewise be selected such that the rear part of the splitter plate 301 fits optimally into the shear flow. The length 306 of the splitter plate 301 between the root edge 302 and the end edge 303 along the profile chord direction is in turn dependent on the trailing edge thickness 307.

FIG. 4 shows a further embodiment of the splitter plate. In this embodiment too, the splitter plate 401 has a root edge 402 below the transition from the suction side 204 to the trailing edge 203, and has an end edge 403. As in the preceding embodiment, the point 404 defines the maximum distance of the surface of the splitter plate 401 from the profile chord 206 of the rotor blade 201 and describes the point at which the shear layer attaches to the splitter plate 401. By contrast to the preceding embodiment of the splitter plate 401, the splitter plate 401 has negative curvature in the profile chord direction, that is to say the X direction, in a first part, which directly adjoins the root edge 402, and has positive curvature in the profile chord direction in a second part, which extends to the end edge 403. As in the preceding embodiment, the distance 405 between the root edge 402 and the profile chord 206 is determined according to the course of the shear flow after the transition from the suction side 204 into the trailing edge 203 and is set such that that part of the splitter plate 401 which has positive curvature at least partially adjoins the shear flow. The distance 408 between the root edge 402 and the point 404 is also determined accordingly. In this embodiment too, the length 406 of the splitter plate 401 is determined via the trailing edge thickness 407 of the rotor blade 201.

FIG. 5 shows an embodiment of the splitter plate according to the embodiment in FIG. 4, wherein the splitter plate 501 again has a root edge 502, an end edge 503 and a point 504 which indicates the maximum distance of the splitter plate 501 from the profile chord 206. In this embodiment, the rotor blade 201 shows a trailing edge profile which differs from the trailing edge profile of the preceding figures. In this embodiment, the trailing edge 509 is rounded and has no sharp edges in the transition between the suction side 204 and the trailing edge 509. In such an embodiment too, a distance 505 may be defined between the profile chord 206 and the root edge 502, and set such that the rear part of the splitter plate 501 lies within the shear layer which is generated by the suction side 204. As in the preceding embodiments, the distance 508 between the root edge 502 and the point 504 is also determined in this embodiment. Furthermore, it is also possible in this case for a trailing edge thickness 507 to be defined, with the length 506 of the splitter plate 501 being determined in a manner dependent thereon. The trailing edge thickness 507 may be defined here for example such that the points of the rotor blade profile at which the rotor blade profile departs from the reference profile contour in favor of the radii of the trailing edge are determined. The distance of these two points from one another may then be defined as the trailing edge thickness 507.

In a further embodiment, the rotor blade has a Gurney flap, with the splitter plate being arranged on the Gurney flap. In this embodiment, the blunt trailing edge is defined by the Gurney flap, wherein the rotor blade itself does not need to have a blunt trailing edge.

In a further embodiment, the splitter plate may be combined with a suction-side extension. With such a combination, the splitter plate may be used to prevent the formation of a Kármán street behind the suction-side extension. In this embodiment, the improvement of the lift can be realized completely or partially by the suction-side extension. Here, an end edge of the suction-side extension and the end edge of the splitter plate may coincide.

The shown exemplary embodiments for a splitter plate are not exhaustive. In this regard, in a further embodiment, the splitter plate could have clockwise curvature in the profile chord direction from the root edge to the end edge. Furthermore, the splitter plate, starting at the root edge, may firstly have clockwise curvature in the profile chord direction and then, for example from the point of the maximum distance of the splitter plate from the profile chord, transition into a straight line. Here, the positive curvature in the profile chord direction could decrease continuously from the point of the maximum distance from the profile chord until the splitter plate becomes straight. Furthermore, from the root point, the splitter plate could be straight from the root point and then have clockwise curvature. In a further embodiment, the splitter plate could also have counterclockwise curvature from the root point, then have an edge and, after the edge, have clockwise curvature in the profile chord direction.

In a preferred embodiment, the length of the splitter plate is 0.75-1.5 times the trailing edge thickness, wherein the splitter plate may also be of shorter form, for example owing to the course of the shear layer.

For achieving an aerodynamic effect of the splitter plate, it is particularly advantageous for clockwise curvature in the profile chord direction to begin at the latest from two thirds of the length of the splitter plate, as measured from the root edge to the end edge. If the splitter plate has a change of curvature, for example a change of curvature from counterclockwise curvature to clockwise curvature, it is advantageous for the change of curvature to take place between 0% and 80% of the length of the splitter plate, as measured from the root edge to the end edge.

The distance between the root edge and the point with the maximum distance from the profile chord, this distance also being referred to as bump height, can be determined by the course of the shear flow in the optimum angle-of-attack range of the rotor blade. Furthermore, the shear flow and thus also the bump height can depend on additional components, such as for example Gurney flaps, which are attached to the rotor blade. Here, it is possible to determine the course of the shear flow experimentally, for example by wind tunnel measurements, or by means of 2D or 3D computer simulations. Accordingly, it is also possible to determine an optimum position of the bump height and of the distance between the root edge and the profile chord such that the curved surface of the splitter plate lies in the shear layer. Although all of the embodiments shown above show a root edge which is arranged above the profile chord, it is also possible for the root edge to be arranged below the profile chord. Furthermore, the end edge of the splitter plate may lie both above and below the root edge.

The invention claimed is:

1. A rotor blade of a wind turbine, the rotor blade comprising:
   a leading edge and a blunt trailing edge;
   a suction side and a pressure side between the leading edge and the blunt trailing edge, wherein the suction side generates a shear layer when air flows around during operation of the wind turbine,
   wherein the leading edge, the blunt trailing edge, the suction side and the pressure side form a reference system in which the leading edge is arranged in front of the blunt trailing edge and the suction side is arranged above the pressure side, and wherein, in the reference system, a profile chord direction extends from the leading edge to the blunt trailing edge; and
   a splitter plate arranged on the blunt trailing edge of the rotor blade, wherein the splitter plate comprises:
      a root edge, wherein the root edge is arranged on the blunt trailing edge below a transition from the suction side into the blunt trailing edge;
      an end edge, wherein the end edge forms a free edge; and
      a plate-shaped body extending between the root edge and the end edge, wherein the plate-shaped body comprises at least one curved part between the root edge and the end edge, and at least one part of the plate-shaped body lies in the shear layer generated by the suction side.

2. The rotor blade as claimed in claim 1, wherein the curved part of the plate-shaped body lies at least partially in the shear layer.

3. The rotor blade as claimed in claim 2, wherein a curvature of the curved part that lies in the shear layer is determined based on a determination of a stress capacity of the shear layer.

4. The rotor blade as claimed in claim 2, wherein the curved part of the plate-shaped body has a clockwise curvature with respect to the profile chord direction of the rotor blade.

5. The rotor blade as claimed in claim 4, wherein the root edge is at a point on the plate-shaped body of the splitter plate at which the plate-shaped body of the splitter plate is at a maximum distance from a profile chord of the rotor blade.

6. The rotor blade as claimed in claim 4, wherein a point on the plate-shaped body of the splitter plate at which the plate-shaped body of the splitter plate is at a maximum distance from a profile chord of the rotor blade lies between the root edge and the end edge.

7. The rotor blade as claimed in claim 2, wherein the curved part of the plate-shaped body has a first part and a second part, wherein the first part and the second part have different curvatures.

8. The rotor blade as claimed in claim 7, wherein the first part has a counterclockwise curvature with respect to the profile chord direction of the rotor blade, and the second part has a clockwise curvature with respect to the profile chord direction of the rotor blade.

9. The rotor blade as claimed in claim 8, wherein the second part adjoins the first part in the profile chord direction.

10. The rotor blade as claimed in claim 7, wherein a transition between the first part and the second part has an edge.

11. The rotor blade as claimed in claim 7, wherein the second part starts, in the profile chord direction, from at least two thirds of a length of the splitter plate in the profile chord direction.

12. The rotor blade as claimed in claim 9, wherein the clockwise curvature of the second part in the profile chord direction decreases continuously.

13. The rotor blade as claimed in claim 10, wherein a point on the plate-shaped body of the splitter plate at which the plate-shaped body of the splitter plate is at a maximum distance from a profile chord of the rotor blade lies in the second part.

14. The rotor blade as claimed in claim 1, wherein the curved part of the plate-shaped body begins at the root edge.

15. The rotor blade as claimed in claim 1, wherein the splitter plate has a straight part, and the straight part adjoins the curved part, and ends with the end edge, in the profile chord direction.

16. The rotor blade as claimed in claim 15, wherein the straight part lies at least partially in the shear layer.

17. The rotor blade as claimed in claim 1, wherein the blunt trailing edge of the rotor blade has a trailing edge thickness, and a length of the splitter plate between the root edge and the end edge in the profile chord direction is 0.75 to 1.5 times the trailing edge thickness.

18. The rotor blade as claimed in claim 1, wherein the end edge of the splitter plate lies in the shear layer and is at a greater distance from the profile chord of the rotor blade than the root edge.

19. The rotor blade as claimed in claim 1, wherein the splitter plate is arranged on the blunt trailing edge of the rotor blade such that the root edge is at a distance from the profile chord of the rotor blade.

20. The rotor blade as claimed in claim 19, wherein the distance from the profile chord is set such that a part of the splitter plate lies in the shear layer.

21. The rotor blade as claimed in claim 1, wherein the splitter plate is arranged on the blunt trailing edge of the rotor blade by a hinge.

22. A wind turbine comprising a rotor, and a rotor blade as claimed in claim 1 coupled to the rotor.

23. A splitter plate for use on a rotor blade of a wind turbine, the splitter plate comprising:
    a root edge, wherein the root edge is configured for arrangement on a trailing edge of the rotor blade;
    an end edge, wherein the end edge forms a free edge; and
    a plate-shaped body between the root edge and the end edge, wherein the plate-shaped body has at least one curved part between the root edge and the end edge, and at least one part of the plate-shaped body is suitable for lying located in a shear layer generated by a suction side of the rotor blade while the wind turbine is in operation,
    wherein the splitter plate is configured to be secured to a blunt trailing edge of the rotor blade of the wind turbine.

24. A method for optimizing a rotor blade of a wind turbine, the method comprising:
    determining a flow pattern of the rotor blade, wherein the determination comprises a determination of a location of a shear layer that is generated by a suction side of the rotor blade while the wind turbine is in operation; and
    determining a distance of a root edge of a splitter plate from a profile chord of the rotor blade, and a curvature of the splitter plate, such that at least one part of the splitter plate lies in the shear layer; and
    securing the splitter plate to a blunt trailing edge of the rotor blade, wherein the splitter plate comprises:
    the root edge, wherein the root edge is arranged on the trailing edge of the rotor blade below a transition from the suction side into the trailing edge;
    an end edge, wherein the end edge forms a free edge; and
    a plate-shaped body extending between the root edge and the end edge, wherein the plate-shaped body comprises the curvature.

* * * * *